United States Patent
Mori et al.

(10) Patent No.: US 7,760,302 B2
(45) Date of Patent: Jul. 20, 2010

(54) DISPLAY DEVICE HAVING COMMON ELECTRODE CORRESPONDING TO A SPECIFIC PIXEL ELECTRODE IN WHICH THE AREA THEREOF IS SMALLER THAN THE AREA OF OTHER ADJOINING PIXEL ELECTRODES AND IN WHICH THAT COMMON ELECTRODE HAS A BRIDGING CONNECTION

(75) Inventors: Ikuko Mori, Chiba (JP); Munenori Motooka, Mobara (JP); Ryutaro Oke, Chiba (JP); Kazunori Ojima, Mobara (JP); Kikuo Ono, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 1014 days.

(21) Appl. No.: 11/477,869

(22) Filed: Jun. 30, 2006

(65) Prior Publication Data
US 2007/0008242 A1 Jan. 11, 2007

(30) Foreign Application Priority Data
Jul. 6, 2005 (JP) ............................. 2005-197770

(51) Int. Cl.
*G02F 1/1337* (2006.01)
(52) U.S. Cl. ...................... 349/129; 349/106; 349/109; 349/110; 349/143
(58) Field of Classification Search ................. 349/106, 349/109–111, 129, 130, 141, 143
See application file for complete search history.

(56) References Cited

U.S. PATENT DOCUMENTS

| | | | |
|---|---|---|---|
| 6,256,081 B1 | 7/2001 | Lee et al. | |
| 6,515,727 B2 * | 2/2003 | Yoon et al. | 349/143 |
| 7,133,093 B2 | 11/2006 | Ochiai et al. | |
| 2003/0086044 A1 * | 5/2003 | Inoue et al. | 349/141 |
| 2004/0095521 A1 | 5/2004 | Song et al. | |
| 2004/0169807 A1 | 9/2004 | Rho et al. | |
| 2004/0189925 A1 * | 9/2004 | Ohmuro et al. | 349/144 |
| 2005/0052590 A1 | 3/2005 | Ochiai et al. | |
| 2006/0017867 A1 * | 1/2006 | Kusafuka et al. | 349/109 |

FOREIGN PATENT DOCUMENTS

| | | |
|---|---|---|
| CN | 1383125 A | 4/2001 |
| CN | 1484071 A | 5/2003 |
| CN | 1591107 A | 9/2004 |
| JP | 2005-084097 | 9/2003 |
| KR | 10-2004-0068398 | 1/2003 |

* cited by examiner

*Primary Examiner*—John Heyman
(74) *Attorney, Agent, or Firm*—Stites & Harbison PLLC; Juan Carlos A. Marquez, Esq.

(57) ABSTRACT

The present invention is intended to control the color temperature of white exhibited by a liquid crystal display device. White is produced when light waves emitted through pixels associated with three colors of red, green, and blue have maximum intensities. The amounts of light emitted through the respective pixels are controlled by differentiating the shapes of the pixel electrodes disposed at the respective pixels from one another. Thus, the color temperature of white is controlled. Otherwise, the shapes of interceptive films disposed at the respective pixels are differentiated from one another in order to control light waves emitted through the respective pixels. Thus, the color temperature of white is controlled. The interceptive film may be shaped like the pixel electrode. Otherwise, the interceptive film may be realized with an interceptive pattern other than that of the pixel electrode or one of openings bored in a black matrix.

2 Claims, 15 Drawing Sheets

DISPLAY DEVICE HAVING COMMON ELECTRODE CORRESPONDING TO A SPECIFIC PIXEL ELECTRODE IN WHICH THE AREA THEREOF IS SMALLER THAN THE AREA OF OTHER ADJOINING PIXEL ELECTRODES AND IN WHICH THAT COMMON ELECTRODE HAS A BRIDGING CONNECTION

CLAIM OF PRIORITY

The present application claims priority from Japanese Application JP 2005-197770 filed on Jul. 6, 2005, the content of which is hereby incorporated by reference into this application.

FIELD OF THE INVENTION

The present invention relates to a display device, or more particularly, to a technology that will be effectively applied to a liquid crystal display device having a liquid crystal display panel that includes pixel locations associated with three primary colors of red, green, and blue.

BACKGROUND OF THE INVENTION

Conventionally, display devices include a liquid crystal display device that has a liquid crystal display panel and that can achieve color display. In recent years, the liquid crystal display device capable of achieving color display has been widely adapted to a liquid crystal television, a liquid crystal display for personal computers, or a display of a personal digital assistant (PDA) or portable cellular phone.

The liquid crystal display panel for color display (hereinafter called a color liquid crystal panel) is a display panel having a liquid crystal material sealed in a space between a first substrate (TFT substrate) in which thin-file transistors (TFTs) and pixel electrodes are set in array, and a second substrate (color filter substrate) in which color filters of red, green, and blue are disposed so that the color filters will be opposed to the respective pixel electrodes. At this time, one dot (display pixel) displayed on the color liquid crystal panel is produced by one set of a red pixel location at which a red color filter is disposed, a green pixel location at which a green color filter is disposed, and a blue pixel location at which a blue color filter is disposed.

A color liquid crystal display panel in which pixel electrodes are disposed at respective pixel locations and oriented in plural directions for the purpose of improvement of a viewing angle has been proposed (refer to, for example, U.S. Pat. No. 6,256,081).

SUMMARY OF THE INVENTION

In conventional liquid crystal display devices, generally, the areas of fields at the red, green, and blue pixels respectively through which light passes are identical to one another. Gray levels to be expressed at respective pixels are controlled independently of one another in order to render various tones.

At this time, white exhibiting a maximum luminance is produced by synthesizing a maximum-luminance shade of red, a maximum-luminance shade of green, and a maximum-luminance shade of blue. The degree of white (for example, reddish white or bluish white) is represented by an index called a color temperature. The color temperature is determined by the balance of luminance values of red, green, and blue respectively. The color temperature directly affects how an image is seen. The color temperature is therefore requested to be highly precisely set to a predetermined value, which is determined as a specification, according to the purpose of use of a product or a consumer's request.

Consequently, many products that exhibit nearly the same characteristics but exhibit different color temperature values must be manufactured. If the specification of the color temperature and the size of a product are associated with each other on a one-to-one correspondence basis, the product can be easily checked for the color temperature. However, plural specifications of color temperatures may be associated with the same product size. In this case, if panels that are different from one another in terms of the specification of the color temperature come to coexist in the course of manufacture because of a trouble occurring in a manufacture control computer, the coexisting panels may become hard to identify.

One object of the present invention is to provide a display device having a color temperature thereof adjusted highly precisely.

Another object of the present invention is to provide a display device whose specification of a color temperature can be readily identified.

The above objects and other objects of the present invention and the novel features thereof will be apparent from the description of the present specification and the appended drawings.

The present invention disclosed in the present application will be outlined below.

(1) In a display device including pixel locations (hereinafter pixels) associated with a first color, pixels associated with a second color, and pixels associated with a third color, any of the three kinds of pixels is a specific pixel at which a metallic pattern whose shape is different from that of a metallic pattern formed at each of the other pixels is formed.

(2) In the display device set forth in (1), the metallic pattern is separated from the other metallic patterns on a planar basis.

(3) In the display device set forth in (1), a pixel electrode disposed at the specific pixel is smaller than the pixel electrode disposed at each of the other pixels.

(4) In the display device set forth in (3), the shape of the pixel electrode disposed at the specific pixel is different from the shape of the pixel electrode disposed at each of the other pixels because the pixel electrode at the specific pixel becomes smaller due to the metallic pattern.

(5) In the display device set forth in any of (1) to (3), common electrodes are superimposed on the respective pixel electrodes on a planar basis. Each of the pixel electrodes includes openings, and the openings bored in a smaller pixel electrode is smaller than those bored in the pixel electrode disposed at each of the other pixels.

(6) In the display device set forth in (4), common electrodes are formed on a planar basis to be superimposed on the respective pixel electrodes. A bridging connection is applied to the metallic pattern in order to connect the common electrode to the common electrode at an adjoining pixel.

(7) A display device includes first pixels at each of which a first color filter is disposed, second pixels at each of which a second color filter is disposed, and third pixels at each of which a third color filter is disposed. At each of the pixels, a pixel electrode is opposed to the color filter. The pixel electrode has plural slits. The area of the pixel electrode at the first pixel defined by the perimeter of the pixel electrode is smaller than the area of the pixel electrode at the second pixel defined by the perimeter of the pixel electrode.

(8) In the display device set forth in (7), an area by which a metallic layer is bared at the first pixel is larger than an area by which the metallic layer is bared at the second pixel.

(9) In the display device set forth in (7) or (8), common electrodes are superimposed on the respective pixel electrodes on a planar basis. Each of the common electrodes is formed on a planar basis to be exposed through the slits in the pixel electrode. A total area occupied by the slits in the pixel electrode disposed at the first pixel is smaller than a total area occupied by the slits in the pixel electrode disposed at the second pixel.

(10) In the display device set forth in any of (7) to (9), the positions of the slits in the pixel electrode at the first pixel are different from the positions of the slits in the pixel electrode at the second pixel.

(11) In the display device set forth in any of (7) to (9), the number of slits formed in the pixel electrode at the first pixel is smaller than the number of slits formed in the pixel electrode at the second pixel.

(12) In the display device set forth in any of (7) to (9), the width of the slits in the pixel electrode at the first pixel is smaller than the width of the slits in the pixel electrode at the second pixel.

(13) In the display device set forth in any of (7) to (9), the spacing between adjoining one of the slits in the pixel electrode at the first pixel is wider than the spacing between adjoining ones of the slits in the pixel electrode at the second pixel.

(14) In the display device set forth in any of (7) to (9), the angle of the slits in the pixel electrode at the first pixel is different from the angle of the slits in the pixel electrode at the second pixel.

Owing to the structure like the one of the implement (1), the display device in accordance with the present invention controls the balance among amounts of light emitted through pixels associated with different colors. At this time, the shape of the metallic pattern can be accurately controlled through photo-fabrication. Consequently, the color temperature can be accurately controlled.

Moreover, since a characteristic metallic pattern is left bared on the pixel, the specification of the color temperature can be readily distinguished by checking the color associated with the pixel at which the metallic pattern is left bared.

Moreover, if the patterns are separated from one another on a planar basis as they are in the implement (2), the specification can be readily distinguished. In particular, automatic decision making can be achieved through pattern recognition.

Moreover, if the metallic pattern is disposed at a pixel whose pixel electrode is smaller in the same manner as it is in the implement (4), the metallic pattern can be further used for another object. Effective use of an area can be achieved. An example is introduced as the implement (6). Consequently, image quality can be improved.

If the structure like the one employed in the implement (5) is adopted, a capacitor is formed between the pixel electrode and common electrode. The capacitances of the capacitors formed at the respective pixels should preferably be equal to one another. This is intended to prevent a variance in the efficiency in writing data in a TFT among the pixels. The capacitance of the capacitor formed at a pixel at which a small pixel electrode is disposed is smaller than the capacitance of the capacitor formed at each of the other pixels. Therefore, openings are formed in the pixel electrode, so that an area occupied by the openings formed at the pixel at which the small pixel electrode is disposed is smaller than an area occupied by the openings formed at each of the other pixels. Consequently, a difference in the area of a pixel electrode between one pixel and the other pixels can be reduced, and a difference in the capacitance can be reduced.

The implement (7) is a concrete example of the display device having the structure like the one of any of the implements (1) to (4), and provides the same advantages as the implement (1).

The implement (9) is a concrete example of the display device having the structure like the one of the implement (5), and provides the same advantages as the implement (5).

The implement (9) may be realized by one of the implements (10) to (14) or a combination thereof.

DETAILED DESCRIPTION OF THE PREFERRED EMBODIMENTS

Figure 1:
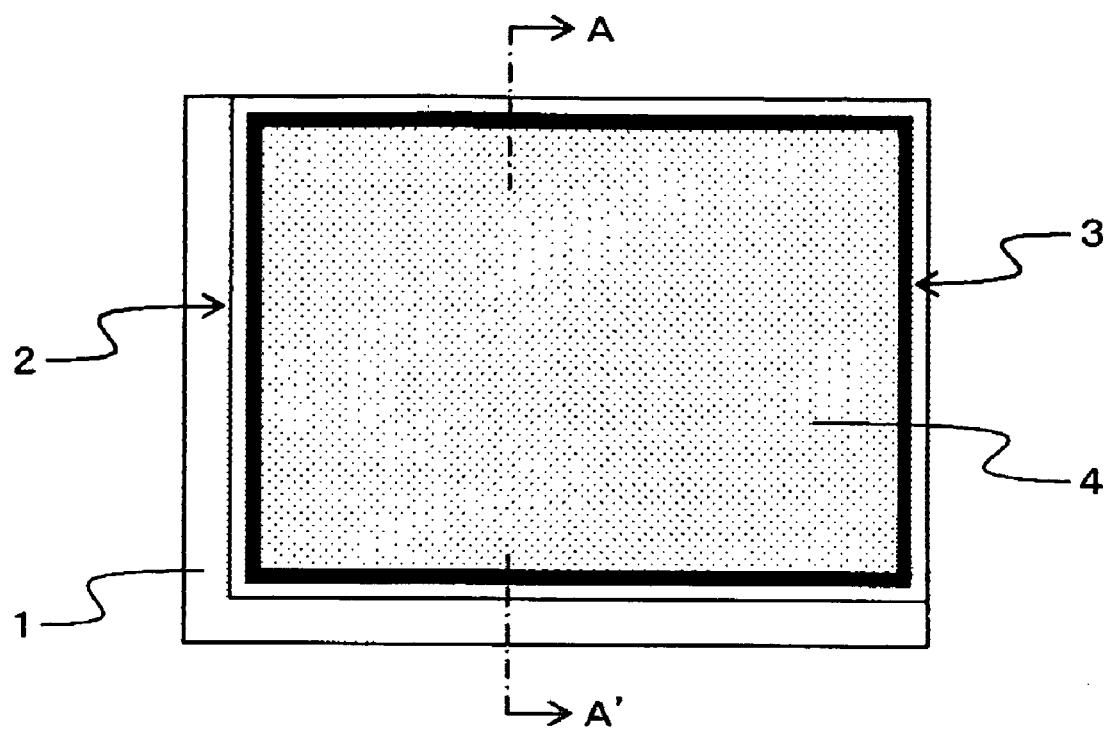
FIG. 1 is a plan view showing an example of a display panel employed in a display device in accordance with the present invention.

Referring to the drawings, the present invention will be described below.

In the drawings, the same reference numerals are assigned to components having the same capabilities. An iterative description of the components will be omitted.

First Embodiment

A liquid crystal display device will be described below as an example of a display device.

Figure 2:
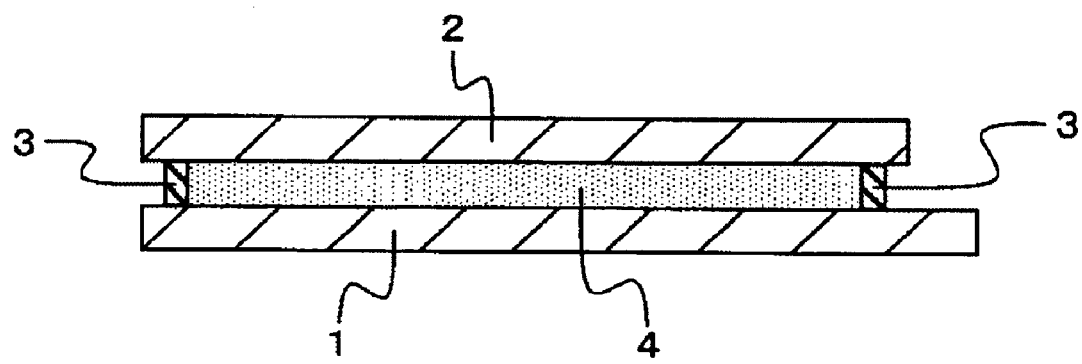
FIG. 2 is an A-A' cross-sectional view of the display panel shown in FIG. 1.

FIG. 1 is an illustrative plan view showing the outline structure of a liquid crystal display panel, and FIG. 2 is an A-A' cross-sectional view of the display panel shown in FIG. 1.

The liquid crystal display device includes a liquid crystal display panel that has, as shown in FIG. 1 and FIG. 2, a first substrate 1 and a second substrate 2 bonded using, for example, an annular sealing member 3, and that has a liquid crystal material 4 sealed in the space defined by the substrates 1 and 2 and the sealing member 3. The liquid crystal display device includes, aside from the liquid crystal display panel, for example, a light source (backlight unit), a circuit board on which a timing controller that controls display on the liquid crystal display panel and other circuits are mounted, and a semiconductor package such as a tape carrier package (TCP), in which a driver IC for driving the liquid crystal display panel is encapsulated, or a package manufactured according to a chip-on-film (COF) technique.

For the sake of explanation, the first substrate 1 shall be a TFT substrate having TFTs and pixel electrodes set in array, and the second substrate shall be a color filter substrate.

Figure 3:
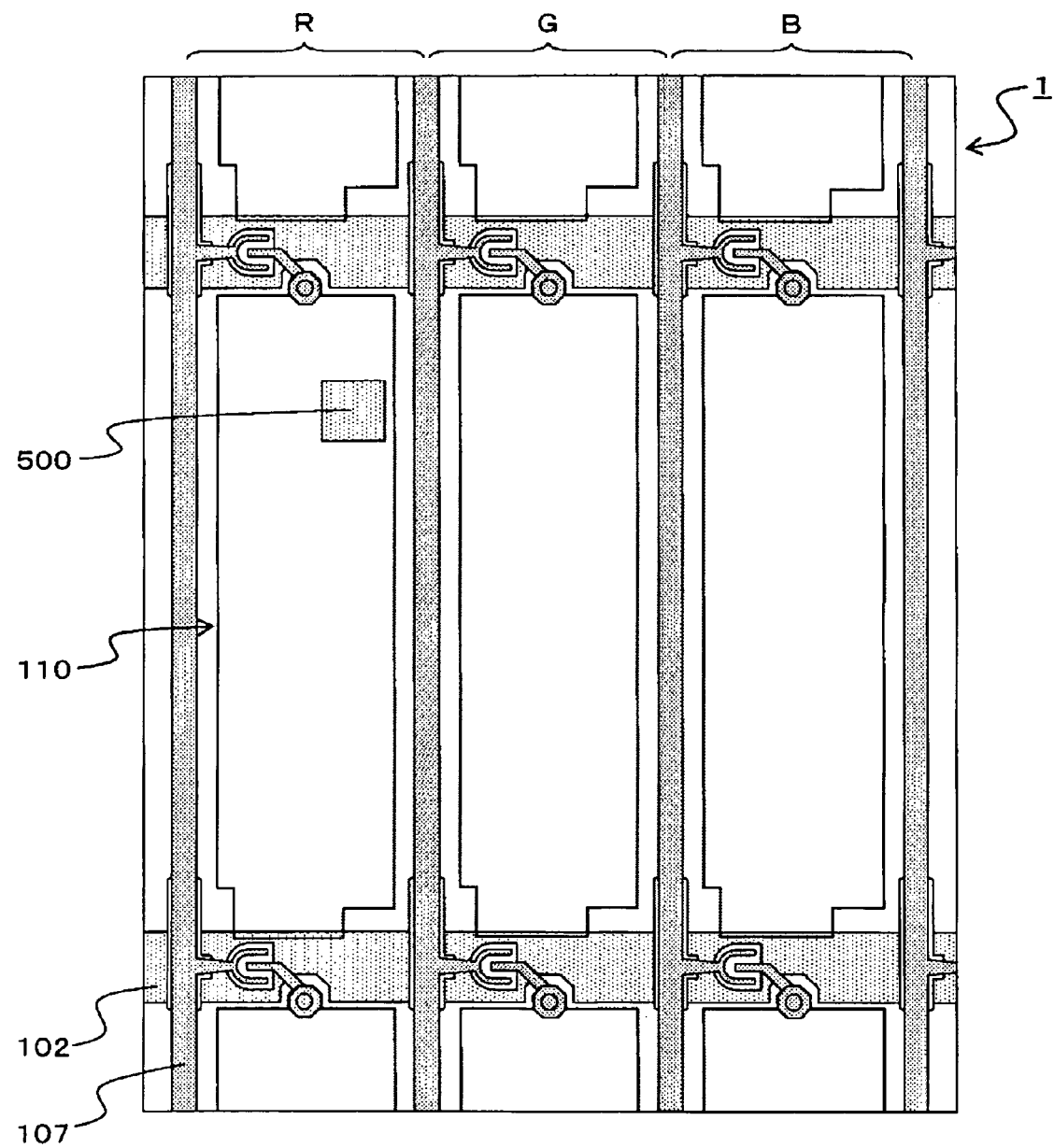
FIG. 3 shows an example of pixels included in the display panel employed in the display device in accordance with the present invention.

FIG. 3 is an illustrative plan view showing an example of the structure of the TFT substrate 1. In the TFT substrate 1, a pixel zone is defined by gate lines 102 and drain lines 107. A signal sent over the drain line is applied to each pixel electrode 110 via a TFT.

In FIG. 3, R denotes red, G denotes green, and B denotes blue. Moreover, R, G, and B indicate the colors with which pixels in the TFT substrate 1 are associated when the color filter substrate 2 is put on the TFT substrate 1.

Referring to FIG. 3, a metallic pattern 500 is disposed at each red pixel as an example. In this case, since an amount of light emitted through the red pixel decreases, white produced as the balance of red, green, and blue is adjusted to be bluish. Since the metallic pattern 500 is formed in the course of manufacturing the TFT substrate, the shape thereof can be highly precisely controlled through photo-fabrication. Moreover, since a metallic material is employed, compared with the employment of a transparent material or an organic film, a variance in dimensions resulting from etching is reduced. The shape of the metallic pattern can be highly precisely controlled. Consequently, the color temperature can be highly precisely controlled.

Moreover, since the metallic pattern 500 is directly formed at each pixel associated with a color that is visualized with a small amount of emitted light, the specification of the color temperature of the panel can be directly distinguished.

Before the TFT substrate is united with the color filter substrate 2, since with what colors the pixels are associated are uniquely determined in the stage of designing, the colors with which the pixels are associated can be directly distinguished. In this case, the color with which a pixel is associated can be more easily distinguished by checking neighboring pixels.

Figure 4:
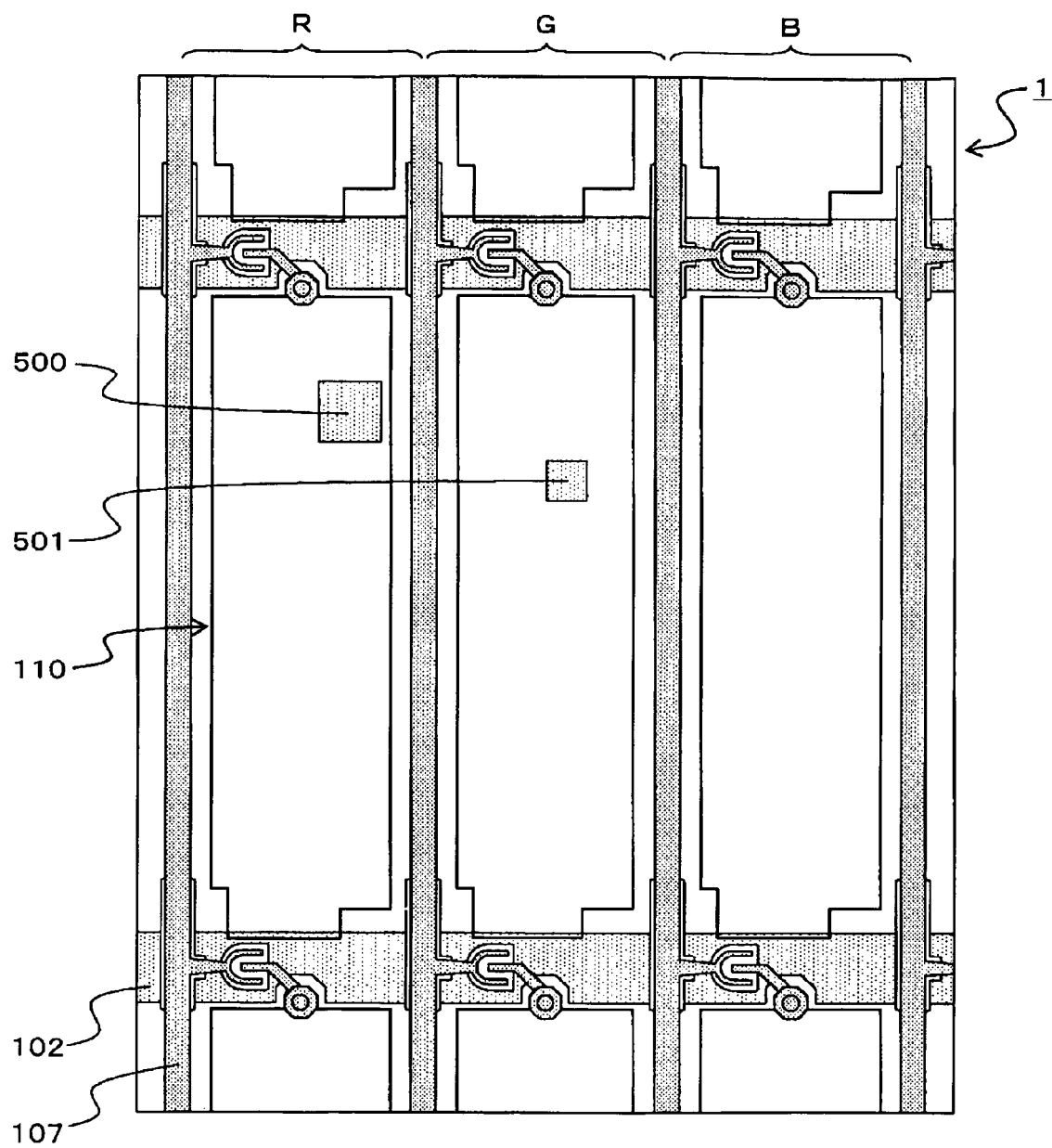
FIG. 4 shows an example of pixels included in the display panel employed in the display device in accordance with the present invention.

FIG. 4 shows an example in which a metallic pattern 501 is formed at each green pixel. The shape of the metallic pattern 501 is different from that of the metallic pattern 500 formed at each red pixel. Consequently, the color temperature can be finely adjusted. In FIG. 4, the position of the metallic pattern 501 in the pixel zone is different from the position of the metallic pattern 500 therein. This is intended to make it easier to distinguish the specification through pattern recognition. The positions of the metallic patterns are deviated from each other horizontally, vertically, or both horizontally and vertically.

Figure 5:
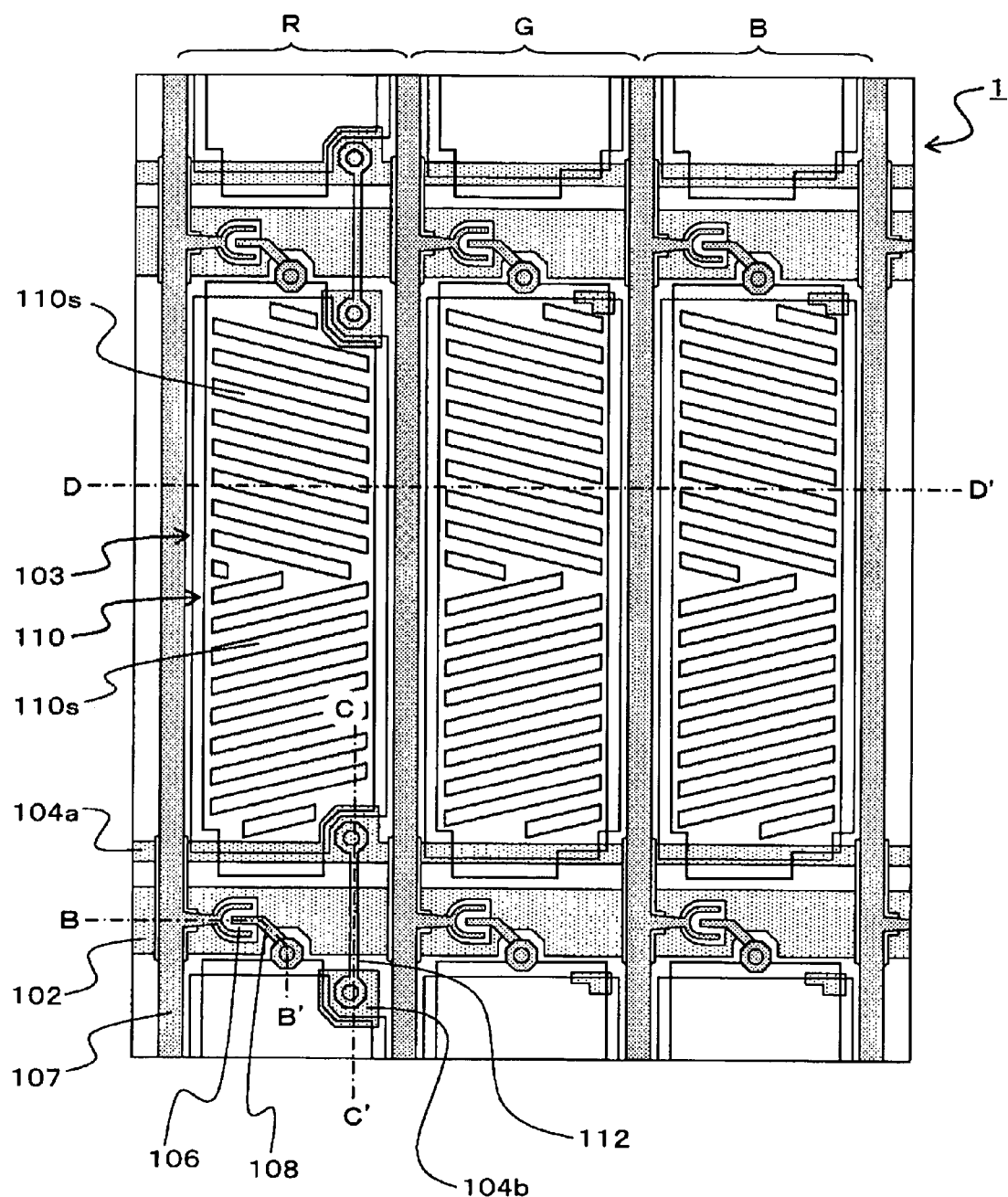
FIG. 5 shows an example of pixels included in the display panel employed in the display device in accordance with the present invention.
Figure 6:
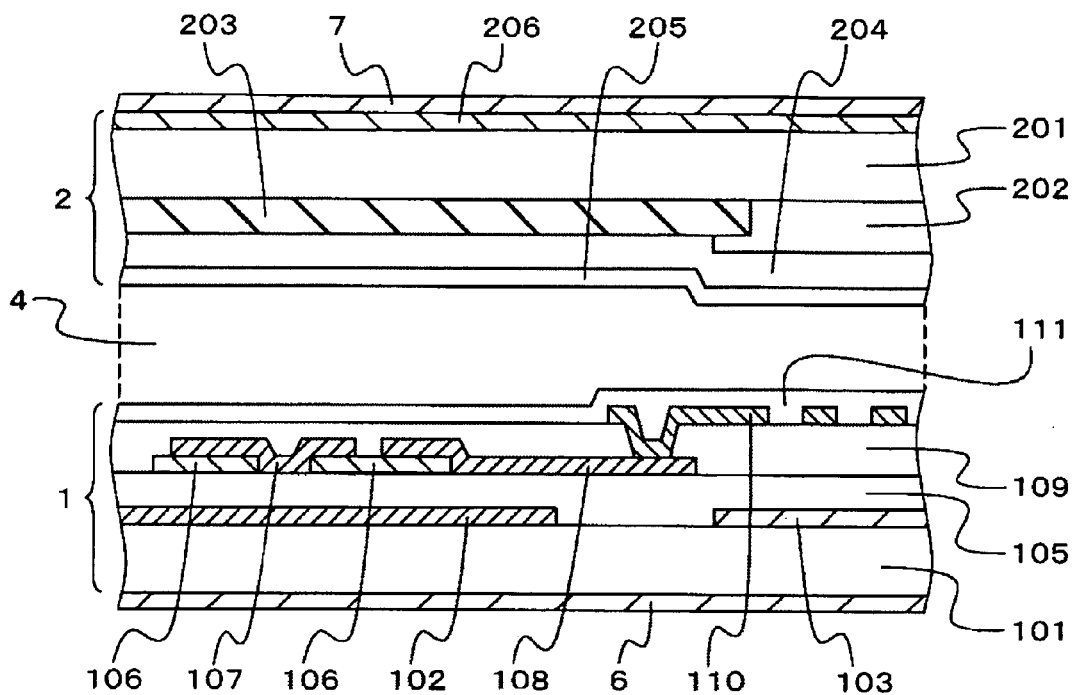
FIG. 6 is a B-B' cross-sectional view of the display panel shown in FIG. 5.
Figure 7:
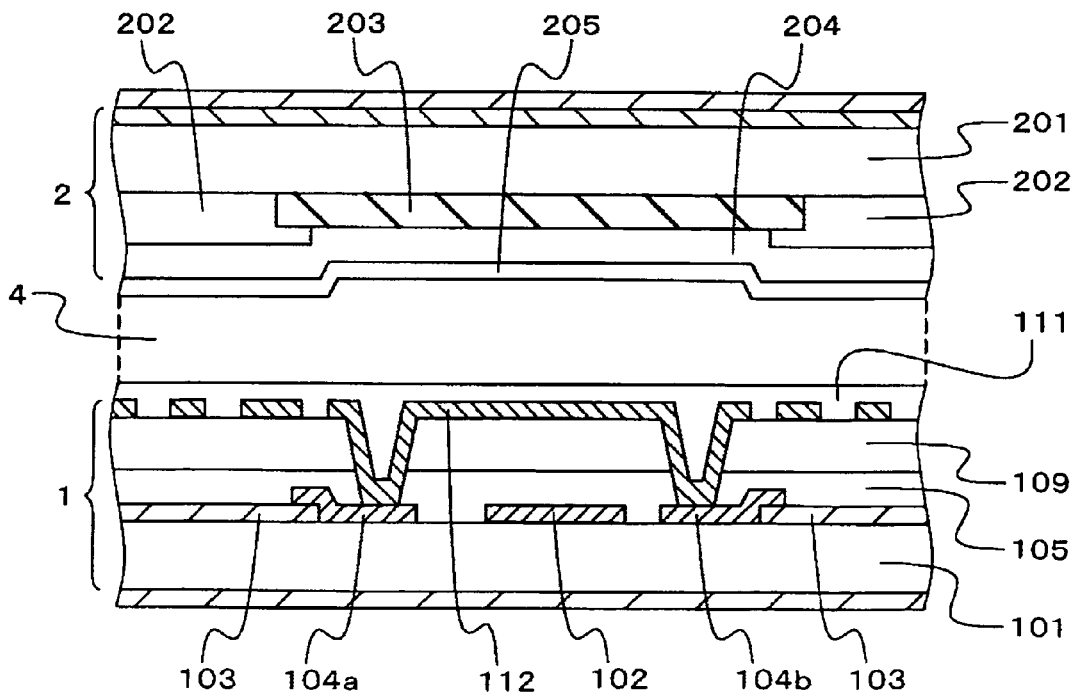
FIG. 7 is a C-C' cross-sectional view of the display panel shown in FIG. 5.

FIG. 5 shows another example of the structure of the TFT substrate 1. FIG. 6 shows a B-B' cross section of the TFT substrate 1 and FIG. 7 shows a C-C' cross section thereof. In the TFT substrate 1 shown in FIG. 5 to FIG. 7, gate lines 102, common electrodes 103, and common signal lines 104a are formed on a transparent substrate 101 such as a glass substrate. Moreover, an amorphous silicon film 106, drain lines 107, and source electrodes 108 are formed on the layer over the gate lines 102 and common electrodes 103 via a first insulating film 105. Each TFT is realized with each gate line 102, the first insulating film 105, the amorphous silicon film 106, each drain line 107, and each source electrode 108.

Pixel electrodes 110 are formed on the layer over the drain lines 107 and source electrodes 108 via a second insulating film 109. The pixel electrodes 110 are, as shown in FIG. 6, connected to the respective source electrodes 108 by way of respective through holes, for example. Moreover, slits 110s extending in a first direction are formed in the upper part of each of the pixel electrodes 110 with the center of each pixel electrode in the extending direction of the drain lines 107. Slits 110s extending in a second direction are formed in the lower half of each pixel electrode. Needless to say, the slits 110s may be extended in one direction. Moreover, an alignment film 111 is formed over the second insulating film 109 and pixel electrodes 110.

Figure 8:
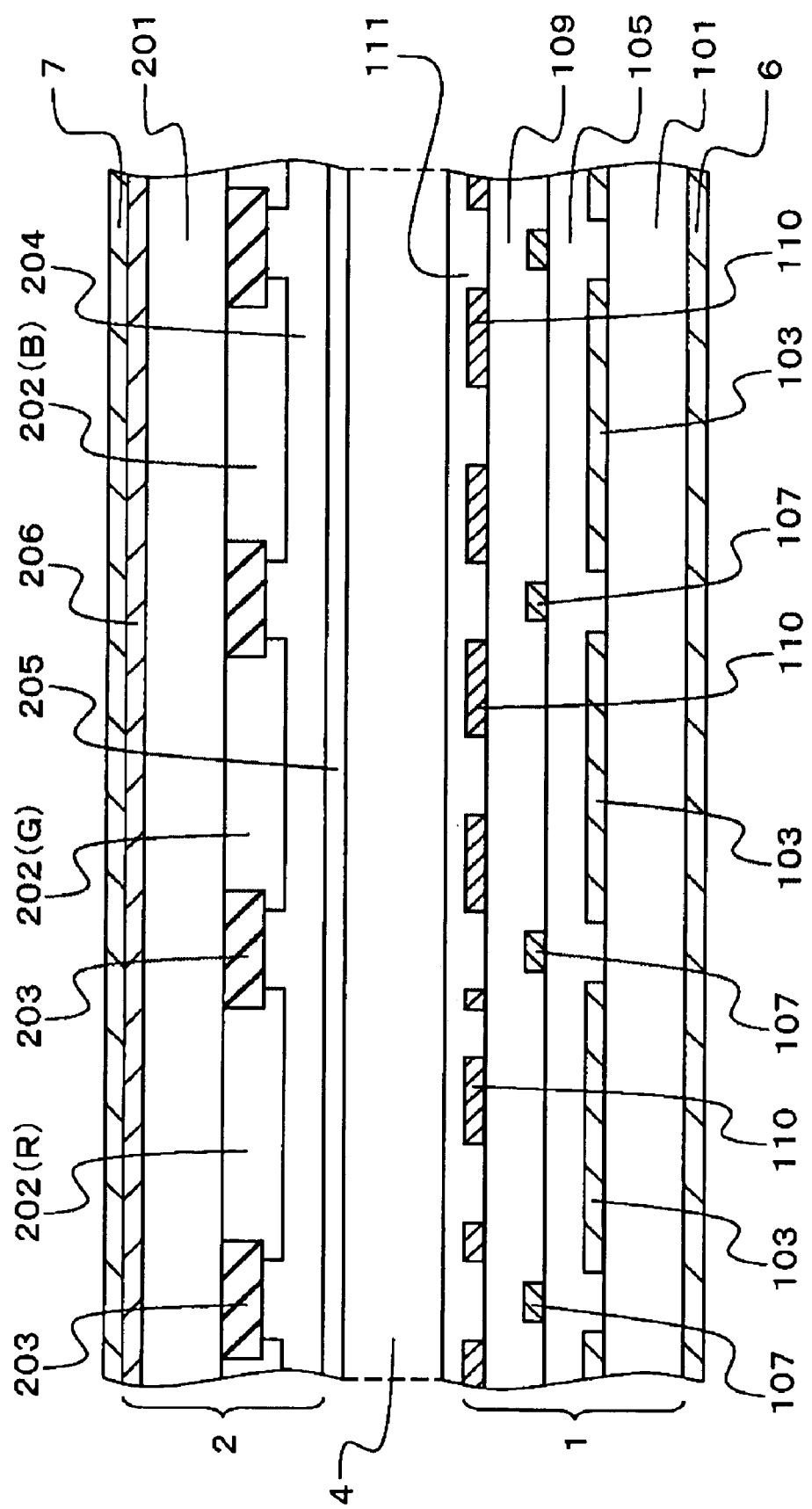
FIG. 8 is a D-D' cross-sectional view of the display panel shown in FIG. 5.

FIG. 8 shows a D-D' cross section of the TFT substrate shown in FIG. 5. Sheet polarizers 6 and 7 are formed on the backs of the TFT substrate 1 and color filter substrate 2 respectively, that is, the sides thereof opposite to the liquid crystal layer 4.

The color filter substrate 2 has, for example, as shown in FIG. 6 to FIG. 8, color filters 202 formed on a transparent substrate 201 such as a glass substrate so that the color filters will be opposed to the pixel electrodes 110 formed in the TFT substrate 1. At this time, the color filters 202 are associated with red, green, and blue respectively that are an example of a set of different colors, and formed as color filters 202R, 202G, and 202B respectively. The color filters 202R, 202G, and 202B may be, as shown in FIG. 8, separated from one another by a black matrix 203. A protective film 204 and an alignment film 205 are formed over the color filters 202 and black matrix 203. A transparent electrode 206 and the sheet polarizer 7, for example, are formed on the back of the color filter substrate 2, that is, the side of the transparent substrate 201 opposite to the side thereof on which the color filters 202 are formed. At this time, the sheet polarizer 7 formed on the color filter substrate 2 is paired with the sheet polarizer 6 formed on the TFT substrate 1.

In a display device that uses three primary colors of red, green, and blue to achieve color display, a set of a red pixel, a green pixel, and a blue pixel constitutes one display pixel.

Various colors can be reproduced by controlling gray levels to be produced at the respective pixels.

In the TFT substrate 1 shown in FIG. 5, the color temperature can be controlled by disposing a metallic pattern 104b, which serves as a field through which light is not emitted, at each of pixels associated with a specific color (red pixels). Since the metallic pattern 104b serves as the field through which light is not emitted, it is an invalid field as it is. The metallic pattern 104b is therefore disposed at a corner of each pixel zone, and the pixel electrode 110 is recessed along the field of the metallic pattern 104b. Consequently, when a bridging connection 112 that will be described later is applied to the field, the irregularity in a luminance can be reduced without influence on an aperture ratio.

Moreover, the common electrodes 103 included in each red pixel, each green pixel, and each blue pixel respectively juxtaposed laterally on the page of FIG. 5 are, as shown in FIG. 5 and FIG. 7, connected to the common signal line 104a and thus used in common.

Moreover, as shown in FIG. 5 and FIG. 7, only the common electrode 103 included in each red pixel is electrically connected to the common electrodes 103 included in other red pixels, which are juxtaposed vertically on the page of FIG. 5 to the red pixel, using the respective bridging connections 112 formed in the same layer as the layer in which the pixel electrodes 110 are formed. For this purpose, each red pixel includes the metallic pattern (electrode pad) 104b that is connected to the bridging connection 112 by way of a through hole and also connected to the common electrode 103. As mentioned above, the common electrodes 103 included in the respective red pixels juxtaposed vertically on the page are connected using the bridging connections 112. Consequently, not only a voltage applied to the common electrodes 103 included in the respective pixels juxtaposed laterally on the page of the drawing is stabilized but also a voltage applied to the common electrodes 103 included in the respective pixels juxtaposed vertically therein is stabilized.

Figure 9:
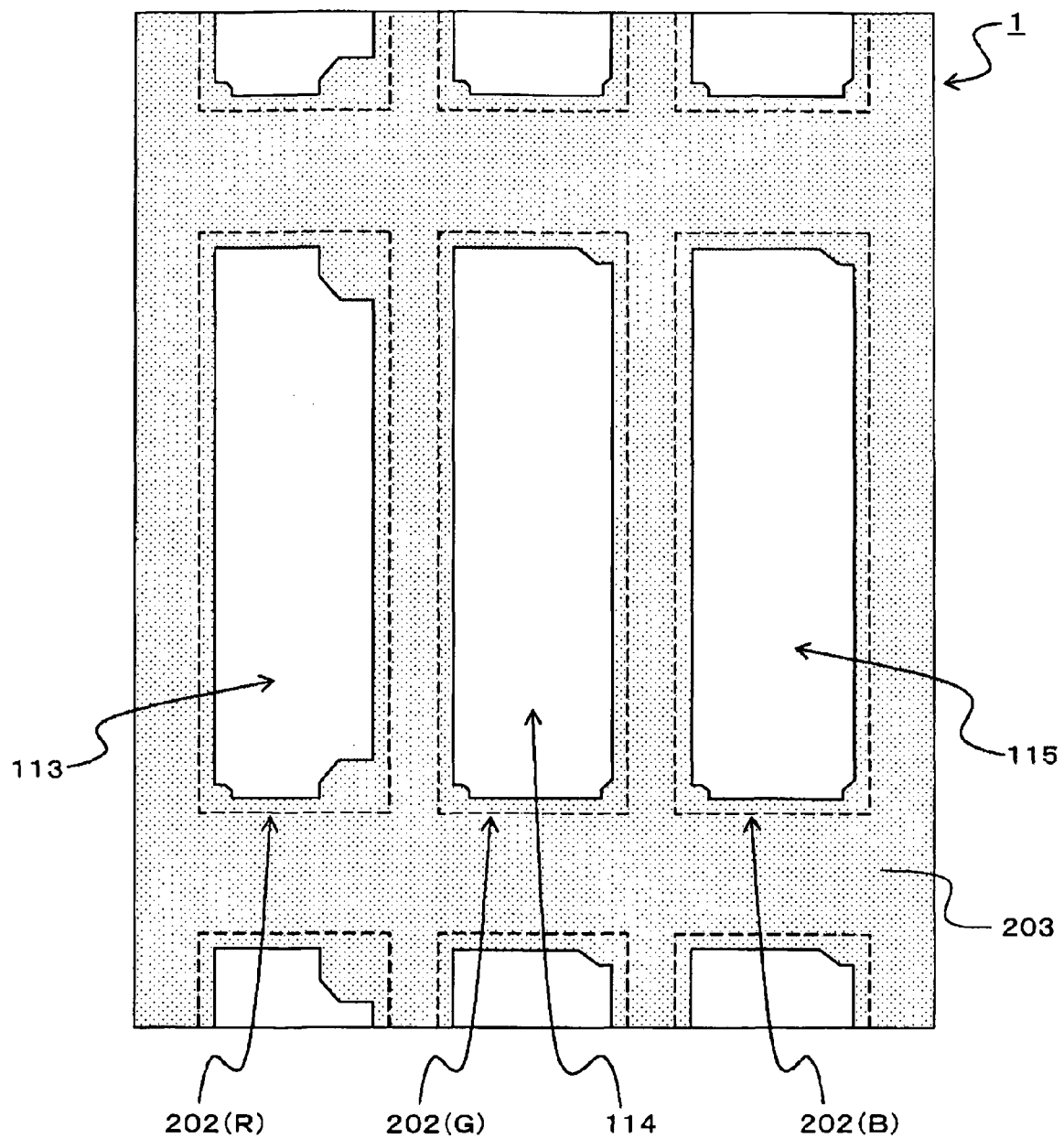
FIG. 9 shows an example of pixels included in the display panel employed in the display device in accordance with the present invention.

FIG. 9 is a plan view showing an example of a display device in which the TFT substrate 1 shown in FIG. 5 is employed, wherein the display device is seen from the side of the color filter substrate 2. 202R denotes a field in which a red color filter is formed, 202G denotes a field in which a green color filter is formed, and 202B denotes a field in which a blue color filter is formed. 203 denotes an interceptive film (black matrix) that has openings aligned with respective pixels. The edges of the interceptive film and the edges of the color filters are superimposed on one another. 113 denotes a field within a red pixel zone through which light passes, 114 denotes a field within a green pixel zone through which light passes, and 115 denotes a field within a blue pixel zone through which light passes.

In the display device, as shown in FIG. 9, the area of the field 113 within the red pixel zone through which light passes is smaller than the area of the field 114 within the green pixel zone through which light passes and the area of the field 115 within the blue pixel zone through which light passes.

Moreover, at each pixel in the TFT substrate 1, as shown in FIG. 5 and FIG. 8, the pixel electrode 110 is layered over the common electrode 103, for example. On a planar basis, the pixel electrode 110 and the common electrode 103 that are planar are superimposed on each other. Consequently, a capacitive device is realized by the common electrode 103, first insulating film 105, second insulating film 109, and pixel electrode 110.

In the example shown in FIG. 5, the area within the outer margin of the pixel electrode 110 disposed at each red pixel is smaller than that at each blue or green pixel. Since the pixel electrode 110 at the red pixel is different from that at the green or blue pixel, a capacitance offered at the red pixel differs from that offered at the green or blue pixel. A voltage to be applied to each pixel electrode 110 via a TFT differs from a voltage to be applied to other pixel electrode. If the way the voltage difference is generated differs from pixel to pixel, an optimal voltage of a common electrode differs from pixel to pixel. Consequently, an afterimage or smear is likely to occur. Therefore, the slits or openings are formed in the pixel electrode 110 at each pixel so that the differences in the area of the pixel electrode among the red, green, and blue pixels can be approximated to one another. In this way, the difference of the capacitance offered at each red pixel from the capacitance offered at each green or blue pixel can be decreased.

For example, as shown in FIG. 5, the area occupied by the slits 110s or openings formed at each red pixel (specific pixel at which the metallic pattern is disposed) is made smaller than the area occupied thereby at each of the other pixels. An area by which the pixel electrode 110 and common electrode 103 are superimposed on each other is calculated by subtracting the area occupied by the slits 110s or openings from the area defined by the outer margin of each pixel zone.

In FIG. 5, the lengths of slits 110s formed in the center of the pixel electrode disposed at each red pixel (specific pixel having the metallic pattern 104b disposed thereat) are different from those of slits formed in the center of the pixel electrode disposed at each of the other pixels. The center of the pixel electrode at each pixel is a field where slits oriented in different directions coexist. By adjusting the lengths of the slits 110s formed in the center of the pixel electrode at each pixel, an invalid field is decreased and the pixel can be effectively utilized.

Figure 10:
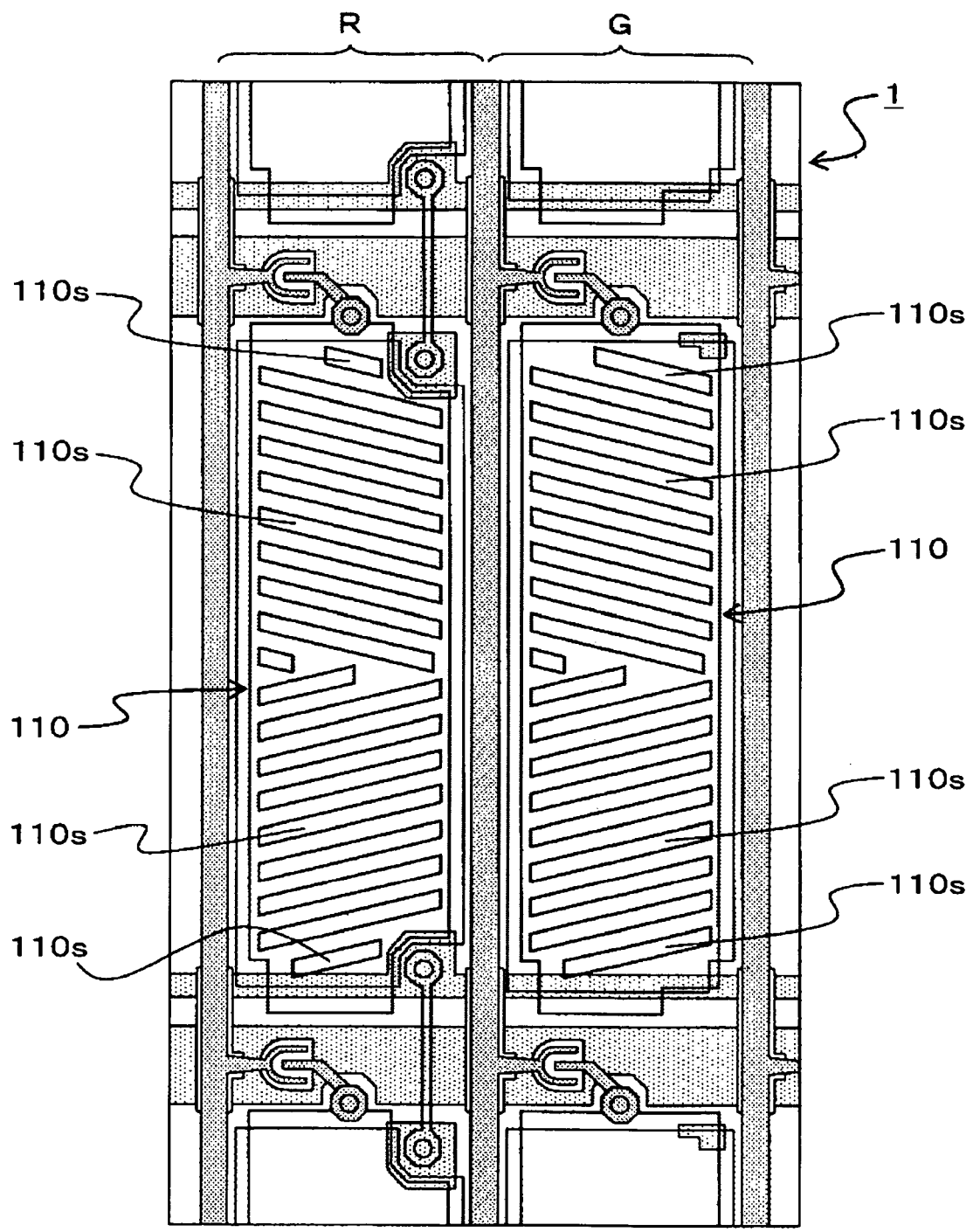
FIG. 10 shows an example of pixels included in the display panel employed in the display device in accordance with the present invention.
Figure 11:
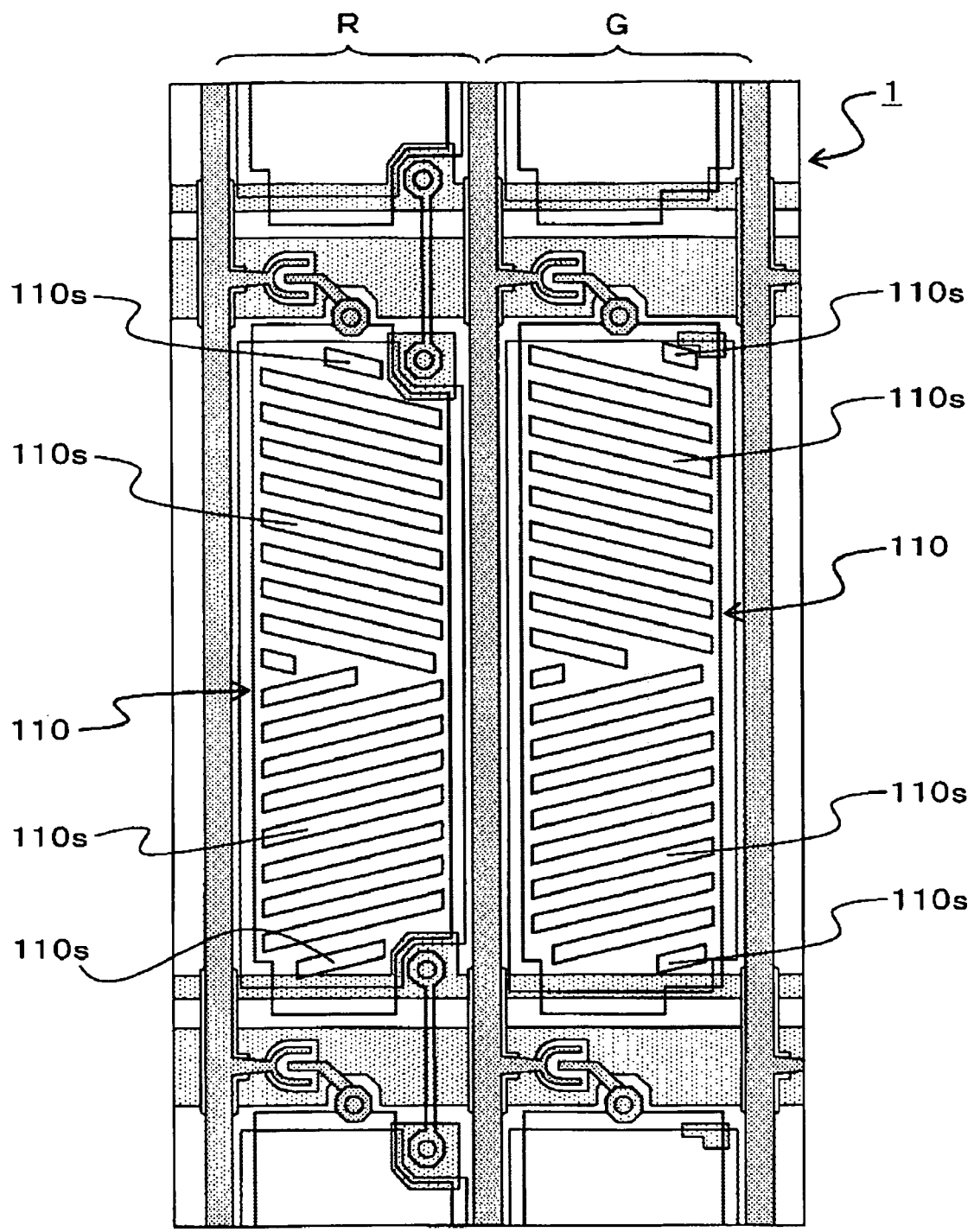
FIG. 11 shows an example of pixels included in the display panel employed in the display device in accordance with the present invention.
Figure 12:
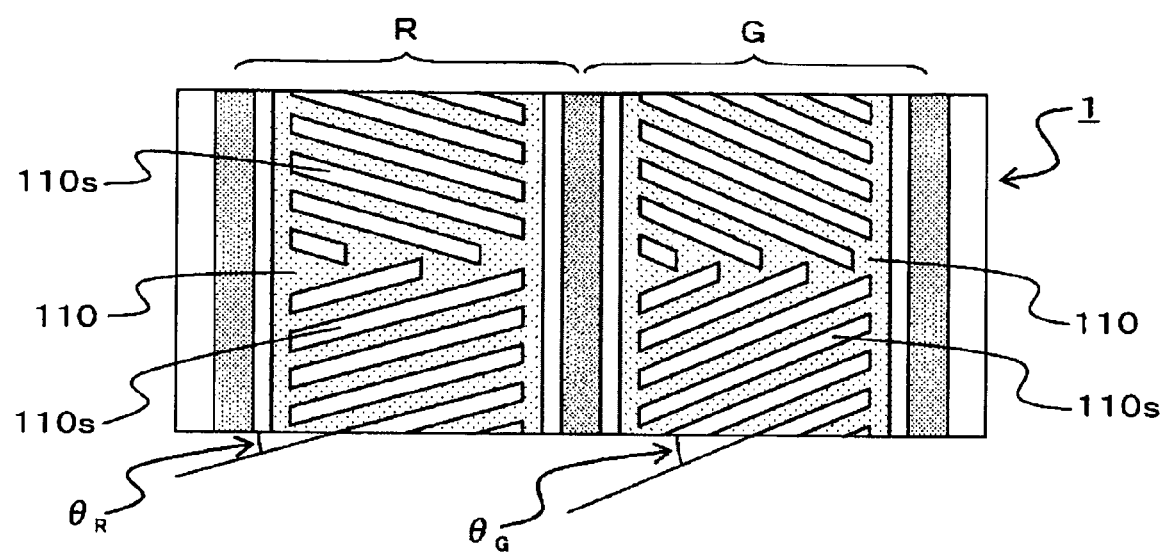
FIG. 12 shows an example of pixels included in the display panel employed in the display device in accordance with the present invention.
Figure 13:
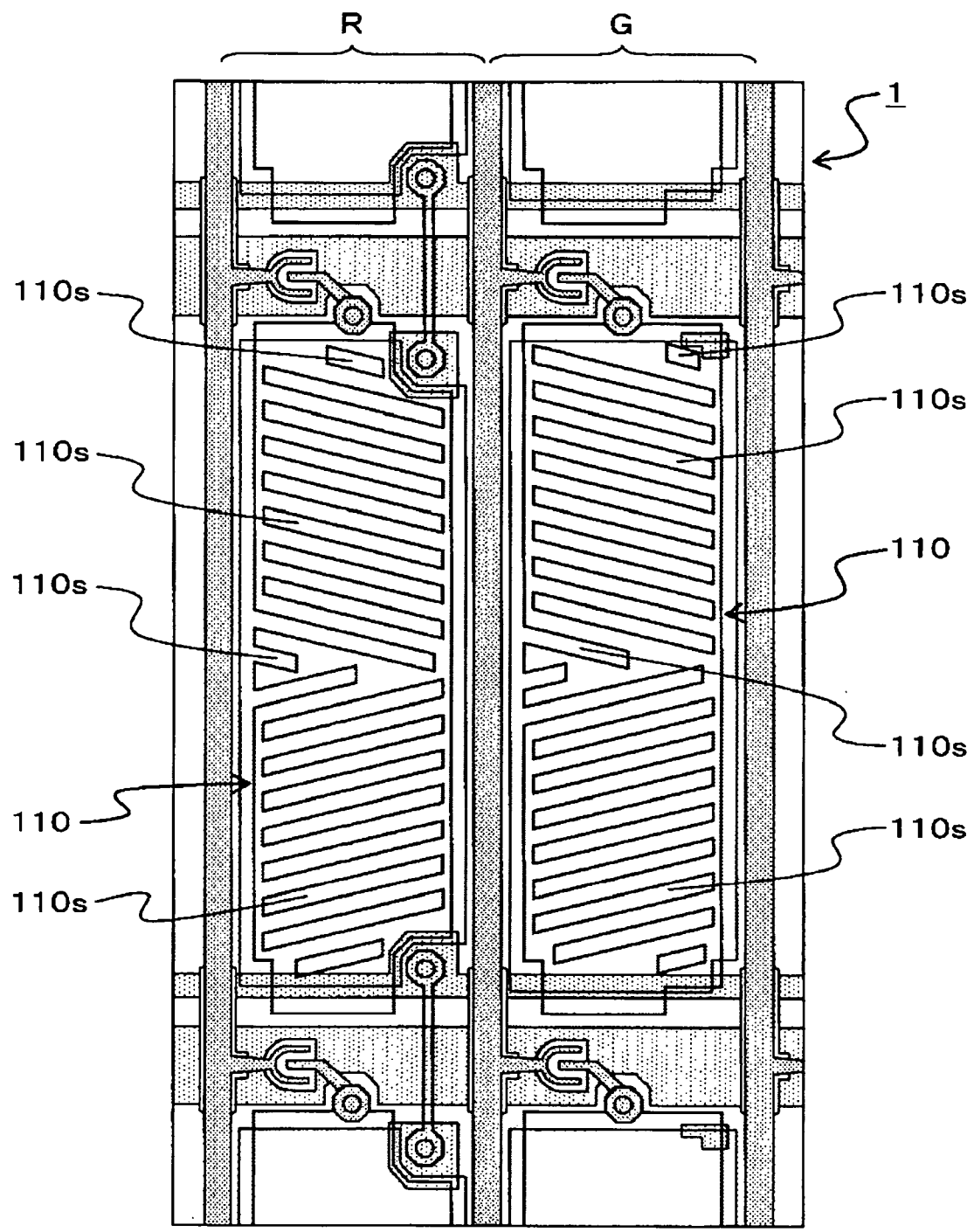
FIG. 13 shows an example of pixels included in the display panel employed in the display device in accordance with the present invention.
Figure 14:
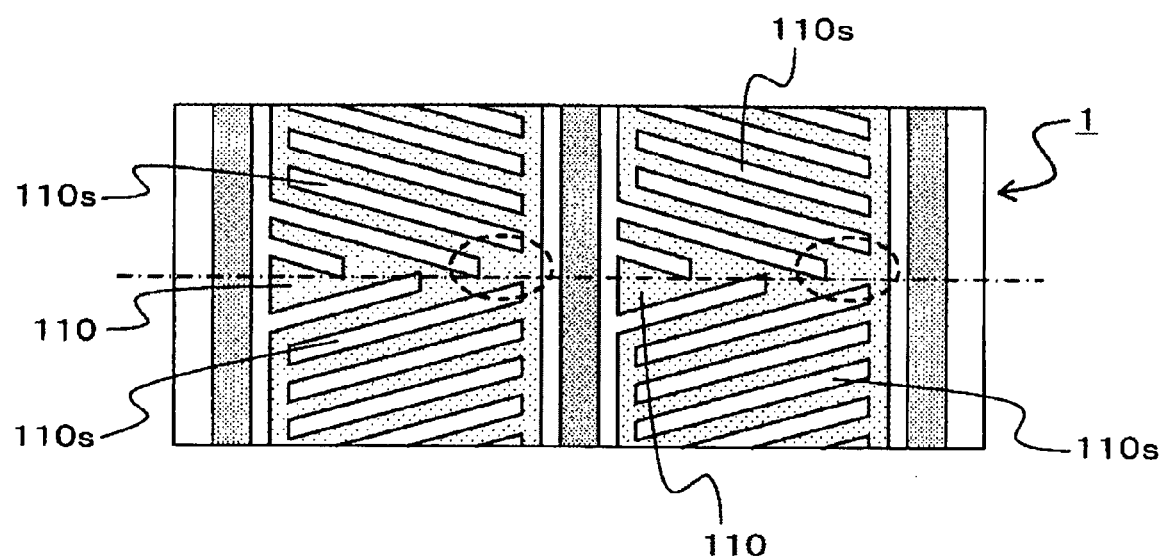
FIG. 14 is a partially enlarged explanatory view of the display panel shown in FIG. 13.

FIG. 10 to FIG. 14 are illustrative explanatory diagrams concerning other ideas of forming slits in a pixel electrode. Since slits formed at each green pixel may have the same pattern as slits formed at each blue pixel do, FIG. 10 to FIG. 14 do not show the blue pixel. FIG. 10 is a plan view showing a case where the positions of slits in each pixel electrode are identical between the red pixel and the green or blue pixel. FIG. 11 is a plan view showing a case where the number of slits in each pixel electrode is different between the red pixel and the green or blue pixel. FIG. 12 is a plan view showing a case where the angle of slits in each pixel electrode is different between the red pixel and the green or blue pixel. FIG. 13 is a plan view showing a case where some of slits in each pixel electrode are left open. FIG. 14 is a partially enlarged plan view showing the case shown in FIG. 13.

The structure disclosed using FIG. 5 has constituent features described below.

(A) An aperture ratio of each red pixel is smaller than an aperture ratio of each of the other pixels, that is, the green or blue pixel.

(B) A total area occupied by the slits 110s in the pixel electrode 110 at each red pixel is smaller than a total area occupied by the slits 110s in the pixel electrode 110 at the green or blue pixel.

In the display device according to the first embodiment, as long as the above two conditions (A) and (B) are satisfied, the shape of the slits 110s may be selected from among various shapes other than the one shown in FIG. 5.

For example, as shown in FIG. 10, the positions of the slits 110s in the pixel electrode at each pixel may be the same between the red pixel and the green or blue pixel, but the slits 110s formed at the upper and lower ends of the pixel electrode 110 at each green pixel may be longer than the slits 110s formed at the upper and lower ends of the pixel electrode 110 at each red pixel.

For example, as shown in FIG. 11, the positions of the slits 110s in the pixel electrode 110 at each green pixel may be shifted, and the number of slits 110s in the pixel electrode 110 at the green pixel may be larger than the number of slits 110s in the pixel electrode 110 at each red pixel. In the case shown in FIG. 11, the number of slits 110s in the pixel electrode 110 at each red pixel is nineteen, and the number of slits 110s in the pixel electrode at each green pixel is twenty.

For example, as shown in FIG. 12, the angle $\theta_G$ of the slits 110s in the pixel electrode 110 at each green pixel may be larger than the angle $\theta_R$ of the slits 110s in the pixel electrode 110 at each red pixel. In this case, for example, in the center of the pixel electrode at each pixel in which the slits oriented in the first direction and the slits oriented in the second direction face each other, an invalid field in the pixel electrode at each green pixel is smaller. Consequently, the aperture ratio of each green pixel becomes larger than the aperture ratio of each red pixel.

Moreover, for example, the spacing between adjoining ones of the slits 110s in the pixel electrode 110 at each green pixel may be narrower than the spacing between adjoining ones of the slits 110s in the pixel electrode 110 at each red pixel. Moreover, the width of the slits 110s in the pixel electrode 110 at each green pixel may be larger than the width of the slits 110s in the pixel electrode 110 at each red pixel.

Moreover, the slits 110s formed in the center of the pixel electrode 110 at each pixel in which the slits oriented in the first direction and the slits oriented in the second direction face each other may have, as shown in FIG. 13 and FIG. 14, one ends thereof merged into the edge of the pixel electrode 110 and left open. When the slits 110s are left open, an invalid field decreases accordingly. Consequently, the aperture ratio of each pixel rises. Moreover, since the slits 110s formed in the field where the slits oriented in the first direction and the slits oriented in the second direction face each other are left open, if the upper or lower half of the pixel electrode 110 becomes defective as shown in FIG. 14, a portion indicated with a dashed line in FIG. 14 should merely be cut out. Thus, the pixel electrode 110 can be divided into two upper and lower portions. This facilitates repair of a defect.

The advantage that a defect can be repaired readily is provided by the structure that the pixel electrode 110 includes a first field in which slits are oriented in a first direction, a second field in which slits are oriented in a second direction, and a third field which is interposed between the first and second portions and in which the slits oriented in the first direction and the slits oriented in the second direction face each other. In the third field, one ends of the slits are left open.

Second Embodiment

Figure 15:
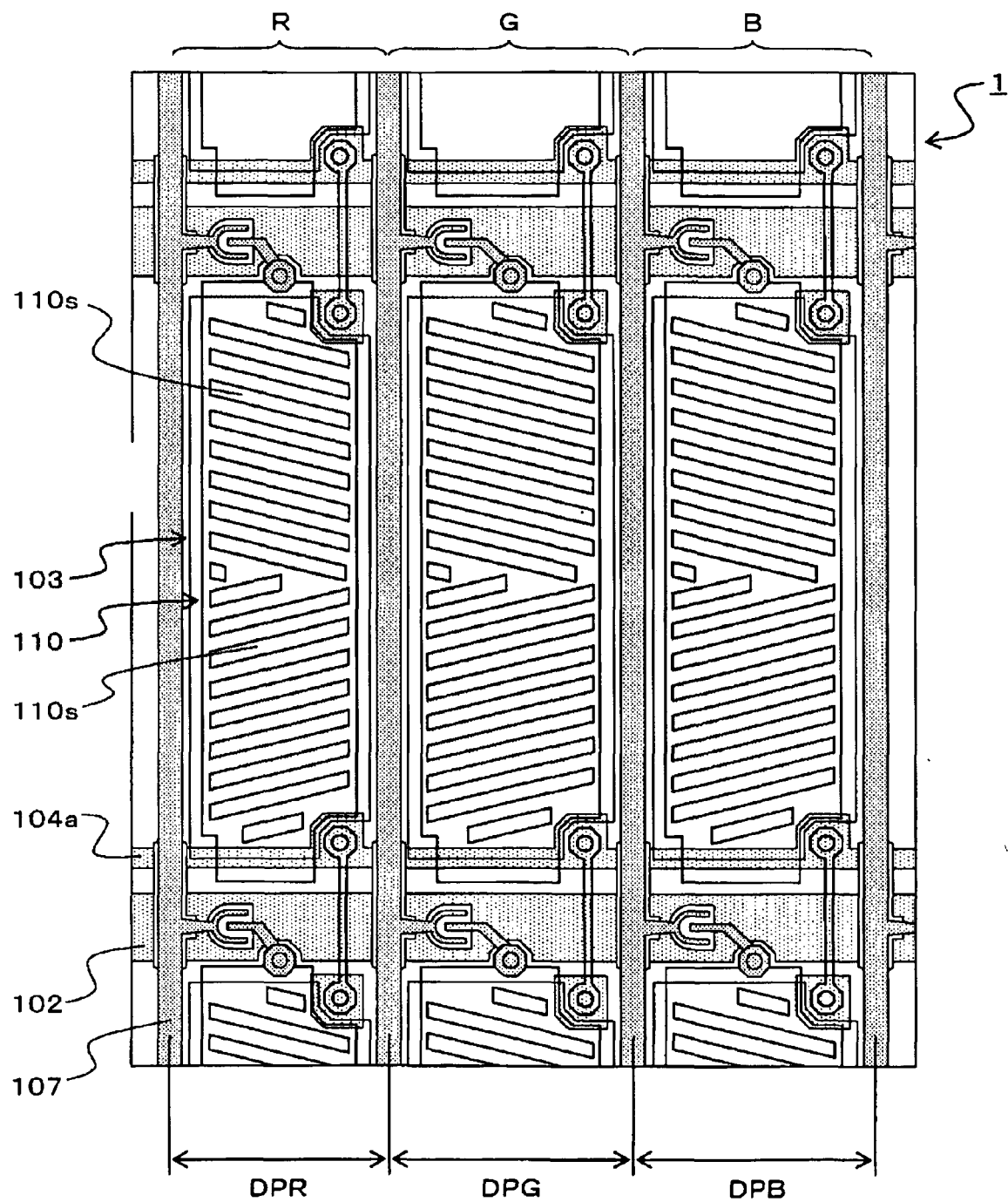
FIG. 15 shows an example of pixels included in the display panel employed in the display device in accordance with the present invention.
Figure 16:
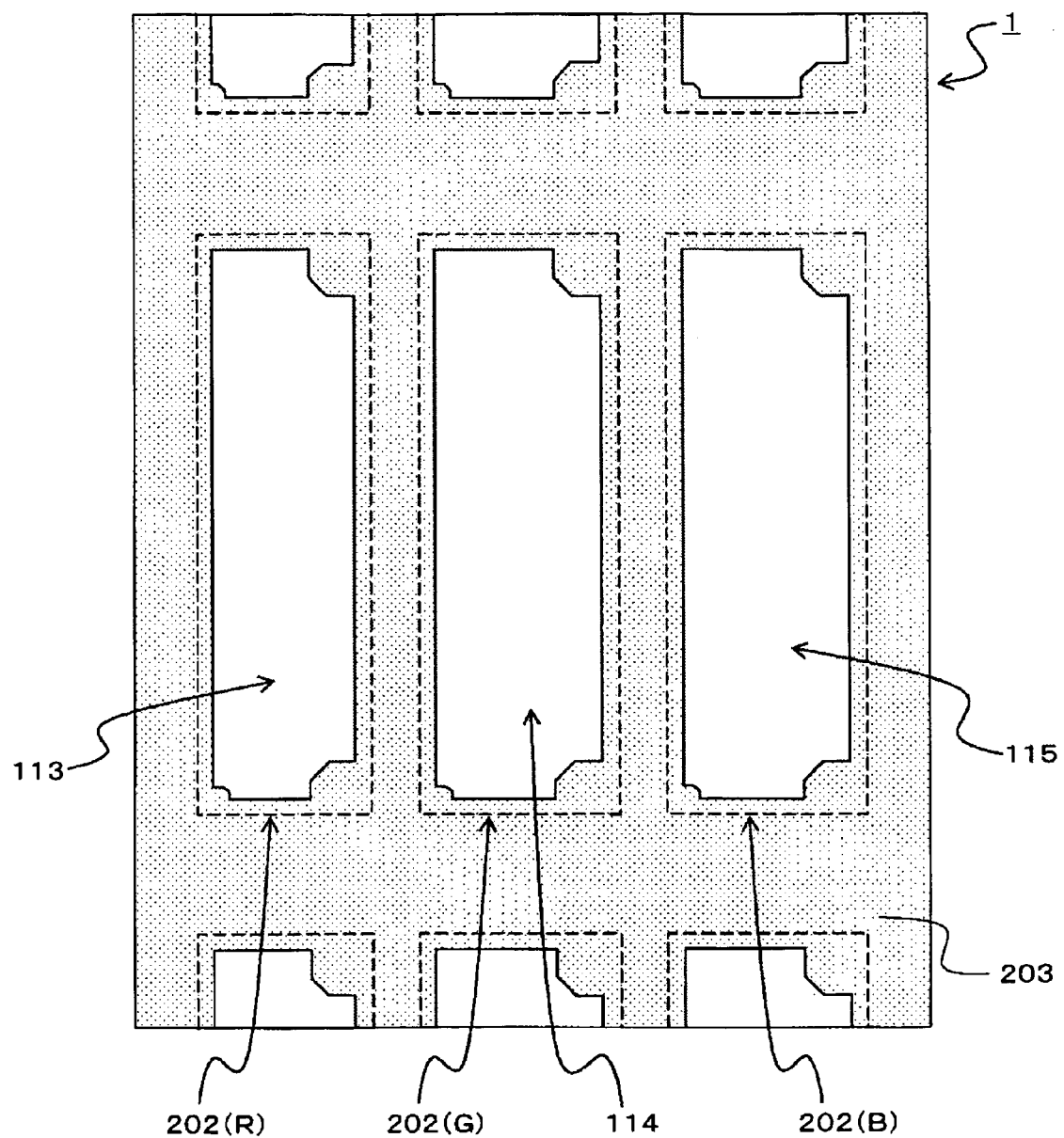
FIG. 16 shows an example of pixels included in the display panel employed in the display device in accordance with the present invention.

FIG. 15 and FIG. 16 are illustrative plan views showing other examples of structures different from the ones shown in FIG. 5 and FIG. 9 respectively.

In the first embodiment, for example, as shown in FIG. 5, only the common electrode 103 included in each red pixel is connected to the common electrode 103 included in other red pixel using a bridging connection 112. Thus, the aperture ratio of, each green or blue pixel is larger than the aperture ratio of each red pixel. The present invention is not limited to this mode. Alternatively, the width of one of the three kinds of pixels may be changed from the width of the other kinds of pixels in order to make the aperture ratio of each green or blue pixel larger than the aperture ratio of each red pixel. In the second embodiment, the width of each red pixel is smaller than the width of each green or blue pixel so that the aperture ratio of the green or blue pixel will be larger than the aperture ratio of the red pixel.

In the TFT substrate 1 included in a liquid crystal display device in accordance with the second embodiment, as shown in FIG. 15, the spacing DPR between drain lines 107 on both the sides of each red pixel is narrower than the spacing DPG or DPB between drain lines 107 on both the sides of each green or blue pixel. In this case, the common electrodes 103 included in the three kinds of pixels respectively may be connected to the common electrodes 103 included in the three kinds of pixels located vertically adjacently using the respective bridging connections 112.

FIG. 16 is a plan view showing the liquid crystal display device shown in FIG. 15 from the side of the color filter substrate. The area 113 of a field within each red pixel zone through which light passes is smaller than the area of a field 114 or 115 within each green or blue pixel zone through which light passes. In other words, in the liquid crystal display device according to the second embodiment, the aperture ratio of each red pixel is smaller than the aperture ratio of each green or blue pixel. Consequently, the color temperature can be controlled in the same manner as that in the first embodiment.

In the liquid crystal display device according to the second embodiment, for example, the slits 110s are formed in the pixel electrode 110 disposed at each pixel in order to improve a viewing angle. When the slits 110s are formed in the pixel electrode, for example, as shown in FIG. 15, the positions of the slits at each red pixel should be different from the positions of the slits at each green or blue pixel. Thus, an invalid field at each red pixel and an invalid field at each green or blue pixel can be reduced. In FIG. 15, the orientation of the slits at each pixel is different between the upper and lower halves of the pixel. The present invention is not limited to this mode. The slits may be oriented in the same direction.

Figure 17:
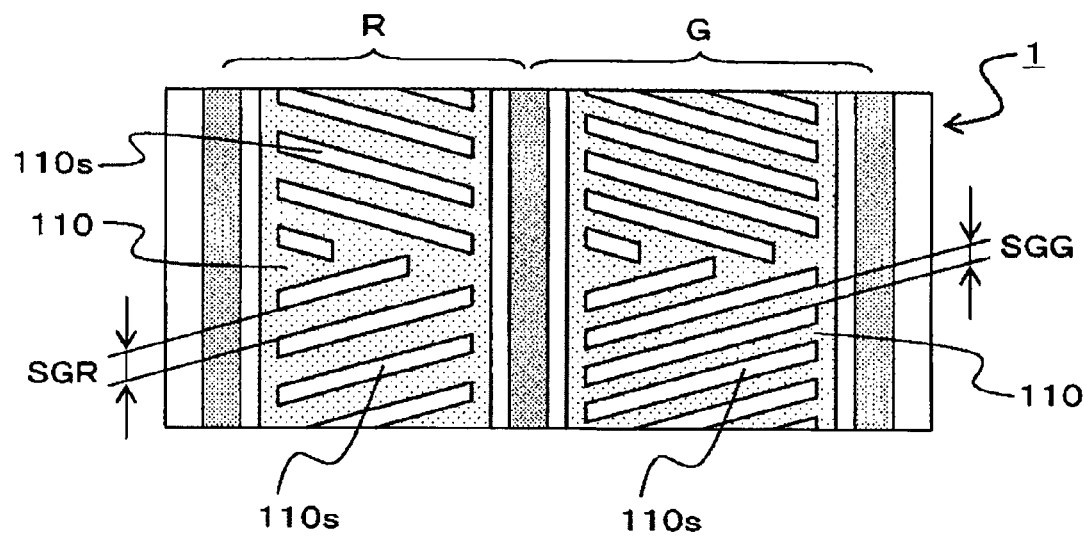
FIG. 17 is an illustrative explanatory diagram of a variant.
Figure 18:
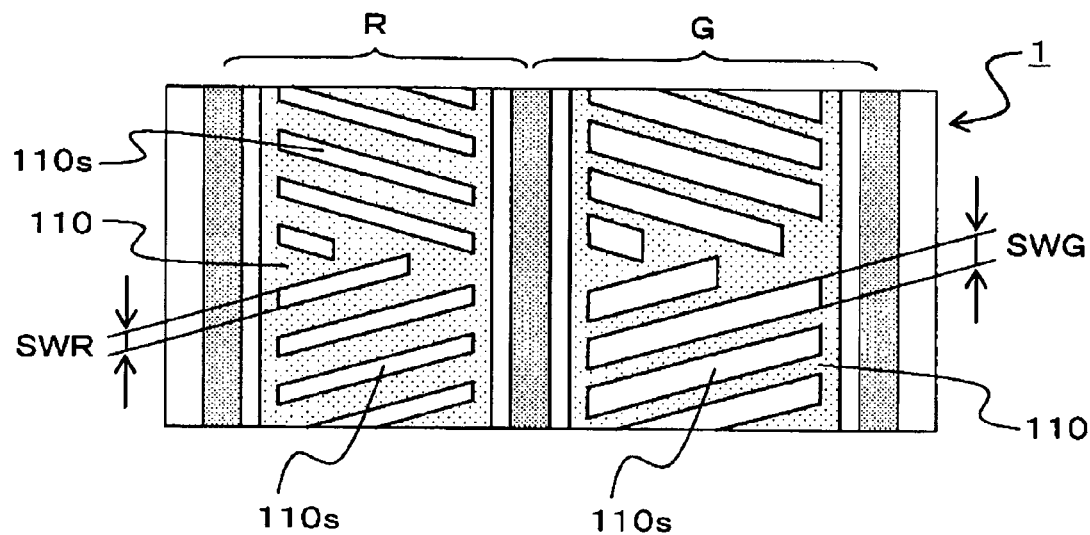
FIG. 18 is an illustrative explanatory diagram of a variant.

FIG. 17 and FIG. 18 are illustrative explanatory diagrams showing variants in which the slits in a pixel electrode are different from those adopted in the liquid crystal display device in accordance with the second embodiment. FIG. 17 is a plan view showing slits having different spacings, and FIG. 18 is a plan view showing slits having different thicknesses.

Even in the second embodiment, similarly to the first embodiment, a total area occupied by the slits 110s in the pixel electrode 110 at each red pixel is smaller than a total area occupied by the slits 110s in the pixel electrode 110 at each green or blue pixel. Thus, differences in a capacitance produced between the common electrode and the pixel electrode occurring among three kinds of pixels are minimized.

Consequently, even in the liquid crystal display panel included in the second embodiment, an area occupied by slits formed at each pixel whose aperture ratio is small is smaller than an area occupied by slits formed at each pixel whose aperture ratio is large. As long as this condition is satisfied, the slits 110s in the pixel electrode 110 at each red pixel may have any relationship to the slits 110s in the pixel electrode 110 at each green or blue pixel. For example, the positions of the slits 110s in the pixel electrode may be the same between the red pixel and the green or blue pixel, but the uppermost and lowermost slits 110s in the pixel electrode 110 at each green pixel may be longer than the uppermost and lowermost slits 110s in the pixel electrode 110 at each red pixel.

For example, as described in relation to the first embodiment, the positions of the slits 110s in the pixel electrode 110 at each green pixel may be shifted so that the number of slits 110s in the pixel electrode 110 at the green pixel will be larger than the number of slits 110s in the pixel electrode 110 at each red pixel.

Otherwise, for example, as described in relation to the first embodiment, the angle $\theta_G$ of the slits 110s in the pixel electrode at each green pixel may be larger than the angle $\theta_R$ of the slits 110s in the pixel electrode at each red pixel. In this case, an invalid field in the center of the pixel electrode 110 at each green pixel in which the slits oriented in the first direction and the slits oriented in the second direction face each other gets narrower. Consequently, the aperture ratio of each green pixel becomes larger than the aperture ratio of each red pixel.

For example, as shown in FIG. 17, the spacing SGG between adjoining ones of the slits 110s in the pixel electrode 110 at each green pixel may be narrower than the spacing SGR between adjoining ones of the slits 110s in the pixel electrode 110 at each red pixel. Moreover, as shown in FIG. 18, the thickness (width) SWG of the slits 110s in the pixel electrode 110 at each green pixel may be larger than the thickness (width) SWR of the slits 110s in the pixel electrode 110 at each red pixel.

The slits formed in the center of the pixel electrode 110 at each pixel in which the slits oriented in the first direction and the slits oriented in the second direction face each other may, as shown in FIG. 13 and FIG. 14, have one ends thereof merged into the edge of the pixel electrode 110 and left open. When the slits are thus left open, an invalid field decreases accordingly. Consequently, the aperture ratio of each pixel improves. At this time, when the slits formed in the field where the slits oriented in the first direction and the slits oriented in the second direction face each other are left open, if the upper or lower half of the pixel electrode 110 becomes, for example, defective, the pixel electrode can be separated into two portions by merely cutting out one portion as shown in FIG. 14.

In the second embodiment, the common electrodes included in each red pixel, each green pixel, and each blue pixel respectively are connected to the common electrodes 103, which are included in pixels located vertically adjacently, using the respective bridging connections 112. The present invention is not limited to this mode. Alternatively, only the common electrode 103 included in each red, green, or blue pixel may be connected to the common electrodes included in pixels located vertically adjacently.

Moreover, the aperture ratios of three kinds of pixels of red, green, and blue pixels may be different from one another, though this constituent feature is not illustrated.

The present invention has been concretely described based on the embodiments. Noted is that the present invention will not be limited to the embodiments but can be modified in various manners without a departure from the gist of the invention.

What is claimed is:

1. A liquid crystal display device in which:

first color filters formed in openings bored in a black matrix, second color filters formed in openings bored in the black matrix, and third color filters formed in openings bored in the black matrix are included in a first substrate;

first, second, and third pixel electrodes are formed in association with the respective color filters in a second substrate opposed to the first substrate with a liquid crystal therebetween;

common electrodes are formed on a planar basis to be superimposed on the respective pixel electrodes with an insulating film therebetween;

a plurality of slits is formed in each of the pixel electrodes; and the liquid crystal is controlled with electric fields induced by each of the pixel electrodes and each of the common electrodes in order to produce an image, wherein:

the common electrode corresponding to a specific pixel electrode out of the first, second, and third pixel electrodes is electrically connected to the common electrodes corresponding to respective adjoining pixel electrodes using respective bridging connections; and the area of the specific pixel electrode defined by the outer margin thereof is smaller than the area of each of the other pixel electrodes defined by the outer margin thereof.

2. A liquid crystal display device in which:

first color filters formed in openings bored in a black matrix, second color filters formed in openings bored in the black matrix, and third color filters formed in openings bored in the black matrix are included in a first substrate;

first, second, and third pixel electrodes are formed in association with the respective color filters in a second substrate opposed to the first substrate with a liquid crystal therebetween;

common electrodes are formed on a planar basis to be superimposed on the respective pixel electrodes with an insulating film therebetween;

a plurality of slits is formed in each of the pixel electrodes;

and the liquid crystal is controlled with electric fields induced by each of the pixel electrodes and each of the common electrodes in order to produce an image, wherein:

the common electrode corresponding to a specific pixel electrode out of the first, second, and third pixel electrodes is electrically connected to the common electrodes corresponding to respective adjoining pixel electrodes using respective bridging connections; and the common electrode associated with each of the pixel electrodes other than the specific pixel electrode is not connected to the common electrodes corresponding to respective adjoining pixel electrodes using the respective bridging connections.

* * * * *